(12) United States Patent
Nielsen et al.

(10) Patent No.: US 9,758,202 B2
(45) Date of Patent: Sep. 12, 2017

(54) VACUUM WALL CRAWLER

(71) Applicant: Force Technology, Brøndby (DK)

(72) Inventors: Steen Arnfred Nielsen, Jyllinge (DK); Peder Bent Hansen, Malmö (SE)

(73) Assignee: FORCE TECHNOLOGY, Brøndby (DK)

( * ) Notice: Subject to any disclaimer, the term of this patent is extended or adjusted under 35 U.S.C. 154(b) by 0 days.

(21) Appl. No.: 14/777,403

(22) PCT Filed: Mar. 21, 2014

(86) PCT No.: PCT/EP2014/055697
§ 371 (c)(1),
(2) Date: Sep. 15, 2015

(87) PCT Pub. No.: WO2014/147217
PCT Pub. Date: Sep. 25, 2014

(65) Prior Publication Data
US 2016/0039483 A1  Feb. 11, 2016

(30) Foreign Application Priority Data
Mar. 22, 2013 (EP) ..................... 13160637

(51) Int. Cl.
*B62D 55/265* (2006.01)
*B62D 55/075* (2006.01)

(52) U.S. Cl.
CPC ......... *B62D 55/265* (2013.01); *B62D 55/075* (2013.01)

(58) Field of Classification Search
CPC ............................ B62D 55/265; B62D 55/075
(Continued)

(56) References Cited

U.S. PATENT DOCUMENTS 4,664,212 A * 5/1987 Nagatsuka ........... B62D 55/265
                                                              180/119
4,699,252 A    10/1987 Sing
(Continued)

FOREIGN PATENT DOCUMENTS

CN      102616294 A    8/2012
CN      102774440 A    11/2012
(Continued)

OTHER PUBLICATIONS

International Preliminary Report of Patentability received for PCT Patent Application No. PCT/EP2014/055697, mailed on Oct. 1, 2015, 7 pages.
(Continued)

*Primary Examiner* — Jacob Knutson
*Assistant Examiner* — Felicia L. Brittman
(74) *Attorney, Agent, or Firm* — Morrison & Foerster LLP (57) ABSTRACT

The present invention relates to a vacuum wall crawler having at least one vacuum track unit comprising a track frame, two pulleys provided in opposite ends of the track frame, and defining a wheelbase, an endless track arranged to circulate on the two pulleys, and comprising a flexible band, said flexible band comprising a plurality of apertures, and having a thickness, a vacuum distribution box provided in said track frame wherein the vacuum distribution box is in communication with a portion of the apertures to distribute a vacuum to the portion of apertures as the endless track circulates, where the thickness of the flexible band is 5-20% of the wheel base.

6 Claims, 9 Drawing Sheets

(58) Field of Classification Search
USPC .......................................................... 180/164
See application file for complete search history.

(56) References Cited

U.S. PATENT DOCUMENTS

| | | | |
|---|---|---|---|
| 7,404,464 B2 | 7/2008 | Imus et al. | |
| 2015/0367901 A1* | 12/2015 | Studer | B62D 55/075 180/9.42 |

FOREIGN PATENT DOCUMENTS

| | | |
|---|---|---|
| CN | 102774441 A | 11/2012 |
| EP | 0416142 A1 | 3/1991 |
| EP | 0710188 B1 | 10/2001 |

OTHER PUBLICATIONS

International Search Report and Written Opinion received for PCT Patent Application No. PCT/EP2014/055697, mailed on Jun. 6, 2014, 8 pages.
Extended European Search Report received for European Patent Application No. 13160637.8, mailed on Sep. 20, 2013, 5 pages.
Intention to Grant received for European Patent Application No. 13160637.8, mailed on Sep. 4, 2015, 6 pages.
Decision to Grant received for European Patent Application No. 13160637.8, mailed on Feb. 11, 2016, 2 pages.
Office Action received for Chinese Patent Application No. 201480028498.0 mailed on Oct. 9, 2016, 5 pages. (See Communication under 37 CFR § 1.98(a) (3)).

* cited by examiner

VACUUM WALL CRAWLER

CROSS REFERENCE TO RELATED APPLICATIONS

This application is a U.S. National Stage patent application of PCT/EP2014/055697, filed on Mar. 21, 2014, which claims priority to European Patent Application No. 13160637.8, filed on Mar. 22, 2013, the entire contents of which are incorporated herein by reference.

The present invention relates to vacuum wall crawler comprising at least one suction track unit of the type having and endless track comprising a continuous band formed in a flexible material, and with a plurality apertures in the continuous band for providing a vacuum between a portion of the apertures and a surface on which the vacuum wall crawler is located or moves.

BACKGROUND OF THE INVENTION

For the purpose of various tasks—e.g. inspection, cleaning de-rusting, decontamination of radioactivity and repairs—in hard to access locations, such as high walls, ceilings, chimneys, the inside of pipes or tanks and other closed spaces, ships or airplane surfaces, etc., it is known in the art to utilize automatic working devices that may be operated by remote control to avoid human presence at the often dangerous location. Examples of such automatic working devices are vacuum wall crawlers, that may bring a tool or camera or the like in close proximity to a vertical, inverted, inclined surface, curved, compound, or tapered surface and to move the tool to various locations on the surface. Some common scenarios include inspecting, cleaning, de-painting, or otherwise maintaining the surfaces of airplanes, submarines, storage tanks, high rise buildings, and other similar structures. These surfaces can be inconvenient, difficult or even dangerous, for people to access directly. The difficulty can be increased when these surfaces are curved, compound, or tapered.

U.S. Pat. No. 7,404,464 describes a traction device for moving on an inclined working surface by applying suction force. The traction device has an upper plate for connection to a wall crawler, and a belt in the form of a thin band formed in a flexible material, the band having a plurality of openings through the belt for suction to a surface, the belt having an outer surface with a high coefficient of friction for movement on coarse surfaces, and an inner surface with a low coefficient of friction for easy sliding over a manifold plate. Further, it discloses a toothed belt for driving a roller of the traction device engagement means.

U.S. Pat. No. 4,664,212 discloses a vacuum wall crawling device, comprising two belts formed as thin bands in a flexible material and each having an inner surface and an outer surface with a plurality of holes through the belt. The inner surface of the bands contacts a stainless steel plate having a small friction coefficient, the plate being attached to a support beam, the plate allowing smooth sliding between belts. The wall crawling device is driven by chains between a motor and a pulley.

The devices disclosed in U.S. Pat. No. 4,664,212 and U.S. Pat. No. 7,404,464, both have means provided to distribute vacuum to recesses in the suction tracks of the device, and both discloses relatively thin suction tracks. If the devices needs to move on a surface having obstacles e.g. protrusions or on curved surfaces the documents teach to section the means provided to distribute vacuum into units being hinged/articulated relative to each other in a frame to compensate the force acting on the portion of the suction tracks between rollers carrying the suction tracks. In U.S. Pat. No. 4,664,212 this is done by making slits in the means provided to distribute vacuum. Therefore, the internal means for distributing vacuum in the two devices are intricate mechanisms, which are heavier, and more complicated and expensive to manufacture.

SUMMARY OF THE INVENTION

On this background, it is an object of the present invention to provide vacuum wall crawler that has an improved ability to pass surfaces having obstacles and curved surfaces. It is a further object of the invention to provide a vacuum wall crawler that has a simpler construction than the prior art vacuum wall crawlers. It is a further object to provide a vacuum wall crawler that is able to pass surfaces having obstacles and curved surfaces, and at the same time having has a simpler construction than the prior art vacuum wall crawlers.

This object is achieved by providing a vacuum wall crawler having at least one vacuum track unit comprising: a track frame; two pulleys provided in opposite ends of the track frame, and defining a wheelbase; an endless track arranged to circulate on the two pulleys, and comprising a flexible band, said flexible band comprising a plurality of apertures, and having a thickness; a vacuum distribution box provided in said track frame, wherein the vacuum distribution box is in communication with a portion of the apertures to distribute a vacuum to the portion of apertures as the endless track circulates, and where the thickness of the flexible band is 5-20% of the wheel base.

Thereby a particularly simple solution allowing a vacuum wall crawler to drive over obstacles and curved surfaces is obtained.

In an embodiment the flexible band is soft. Preferably, the softness is 10-30 (shore 0 hardness), according to ASTM D 2240.

In a further embodiment the flexible band is an outer band, the endless track further comprising an inner band, said inner band having suction holes allowing vacuum to pass between the vacuum distribution box and the portion of apertures.

In a further embodiment the vacuum distribution box is sectioned into vacuum compartments along a longitudinal direction of said vacuum track unit.

In a further embodiment the suction holes are so small that they will delay the reduction of vacuum in a vacuum compartment if a vacuum disappears in an aperture connected to the vacuum compartment.

In a further embodiment the plurality of apertures may be arranged in two rows along a longitudinal direction of said vacuum track unit.

In a further embodiment a length in a longitudinal direction of said vacuum track unit of an aperture is greater than a distance between to neighbouring apertures along the longitudinal direction.

In a further embodiment said vacuum distribution box is sectioned into vacuum compartments of equal length along a longitudinal direction of said vacuum track unit, and the length of said vacuum compartments is adapted such that each vacuum compartment may supply vacuum to two apertures along the longitudinal direction.

In a further embodiment the vacuum distribution box is sectioned into vacuum compartments of equal length along a longitudinal direction of said vacuum track unit, and each vacuum compartment is provided with a support flange, the support flange dividing each vacuum compartment into two half compartments, the support flange further extending in the longitudinal direction of the vacuum track unit.

In yet an embodiment further comprising two vacuum track units arranged in parallel and connected by a main frame, the main frame and the vacuum track units are arranged to articulate relative to each about an axis of a joint, said axis being parallel to a longitudinal axis of the vacuum track units.

In a second aspect the invention relates to a vacuum wall crawler having at least one vacuum track unit comprising:
  a track frame;
    two pulleys provided in opposite ends of the track frame, and defining a wheelbase;
    an endless track arranged to circulate on the two pulleys, and comprising a flexible band, said flexible band comprising a plurality of apertures, and having a thickness;
    a vacuum distribution box provided in said track frame, where the vacuum distribution box is in communication with a portion of the apertures to distribute a vacuum to the portion of apertures as the endless track circulates, and where the flexible band is an outer band, the endless track further comprising an inner band, said inner band having suction holes allowing vacuum to pass between the vacuum distribution box and the portion of apertures.

Thereby a particular simple way of allowing the suction track to slide on the track frame is provided.

In an embodiment the thickness, of the band is 5-20% of the wheel base.

In a further embodiment the flexible band is soft. Preferably, the softness of the flexible band is 10-30 (shore 0 hardness), according to ASTM D 2240.

In further embodiments of the vacuum wall crawler according the second aspect of the invention, the vacuum wall crawler may further comprise the further features defined in relation to the embodiments of the first aspect of the invention described above.

In a third aspect, the invention relates to a vacuum wall crawler having at least one vacuum track unit comprising:
  a track frame;
    two pulleys provided in opposite ends of the track frame, and defining a wheelbase;
    an endless track arranged to circulate on the two pulleys, and comprising a flexible band, said flexible band comprising a plurality of apertures, and having a thickness;
    a vacuum distribution box provided in said track frame, where the vacuum distribution box is in communication with a portion of the apertures to distribute a vacuum to the portion of apertures as the endless track circulates, and where the flexible band comprises an outer band having a softness of 10-30 (shore 0 hardness), according to ASTM D 2240.

In further embodiments of the vacuum wall crawler according the third aspect of the invention, the vacuum wall crawler may further comprise the further features defined in relation to the embodiments of the first aspect of the invention described above.

A fourth aspect of the invention relates to a vacuum wall crawler having at least one vacuum track unit comprising:
  a track frame;
    two pulleys provided in opposite ends of the track frame, and defining a wheelbase;
    an endless track arranged to circulate on the two pulleys, and comprising a flexible band, said flexible band comprising a plurality of apertures, and having a thickness;
    a vacuum distribution box provided in said track frame, where the vacuum distribution box is in communication with a portion of the apertures to distribute a vacuum to the portion of apertures as the endless track circulates, and wherein said vacuum distribution box is sectioned into vacuum compartments of equal length along a longitudinal direction of said vacuum track unit, and wherein each vacuum compartment is provided with a support flange dividing the vacuum compartment into two half compartments, the support flange extending in the longitudinal direction of the vacuum track unit.

In preferred embodiments the apertures are arranged in two or three rows along a longitudinal direction of said vacuum track unit. In a further embodiment, the apertures take up 70-90% of the width of the band.

In further embodiments of the vacuum wall crawler according the fourth aspect of the invention, the vacuum wall crawler may further comprise the further features defined in relation to the embodiments of the first aspect of the invention described above.

The objects of the invention may further be achieved by a fifth aspect of the invention in which a vacuum wall crawler has at least one vacuum track unit comprising: a track frame; two pulleys provided in opposite ends of the track frame, and defining a wheelbase; an endless track arranged to circulate on the two pulleys, and comprising a flexible band, said flexible band comprising a plurality of apertures, and having a thickness; a vacuum distribution box provided in said track frame, wherein the vacuum distribution box is in communication with a portion of the apertures to distribute a vacuum to the portion of apertures as the endless track circulates, and where the thickness of the flexible band is 15-40% of the diameter of the smallest of the front and rear pulleys.

In one embodiment the thickness of the flexible band is 20-40% of the diameter of the smallest of the front and rear pulleys.

In another embodiment the thickness of the flexible band is 25-35% of the diameter of the smallest of the front and rear pulleys.

In one embodiment, the pulleys are of equal diameter.

In further embodiments of the vacuum wall crawler according the fifth aspect of the invention, the vacuum wall crawler may further comprise the further features defined in relation to the embodiments of the first aspect of the invention described above.

The wheel diameter is defined as twice the radius from the axis of rotation of the pulley to the outer surface of the pulley on which the flexible band is supported.

Further objects, features, advantages and properties of the vacuum wall crawler according to the invention will become apparent from the detailed description.

Throughout the description, the terms inner and outer bands are used. In the context of this application, a band is considered to be an endless or continuous elongate flat and flexible structure that is formed as one entity as opposed to being formed by joining of numerous entities (such as a chain is).

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE INVENTION

In the following detailed description a vacuum wall crawler 1 and a suction track unit 100 according to the invention will be described by the preferred embodiments.

The construction and operation of a vacuum wall crawler 1 is as such well-known and should not require further explanation in the present context. However, further details regarding the operation of the vacuum wall crawler 1 are provided below.

Figure 1:
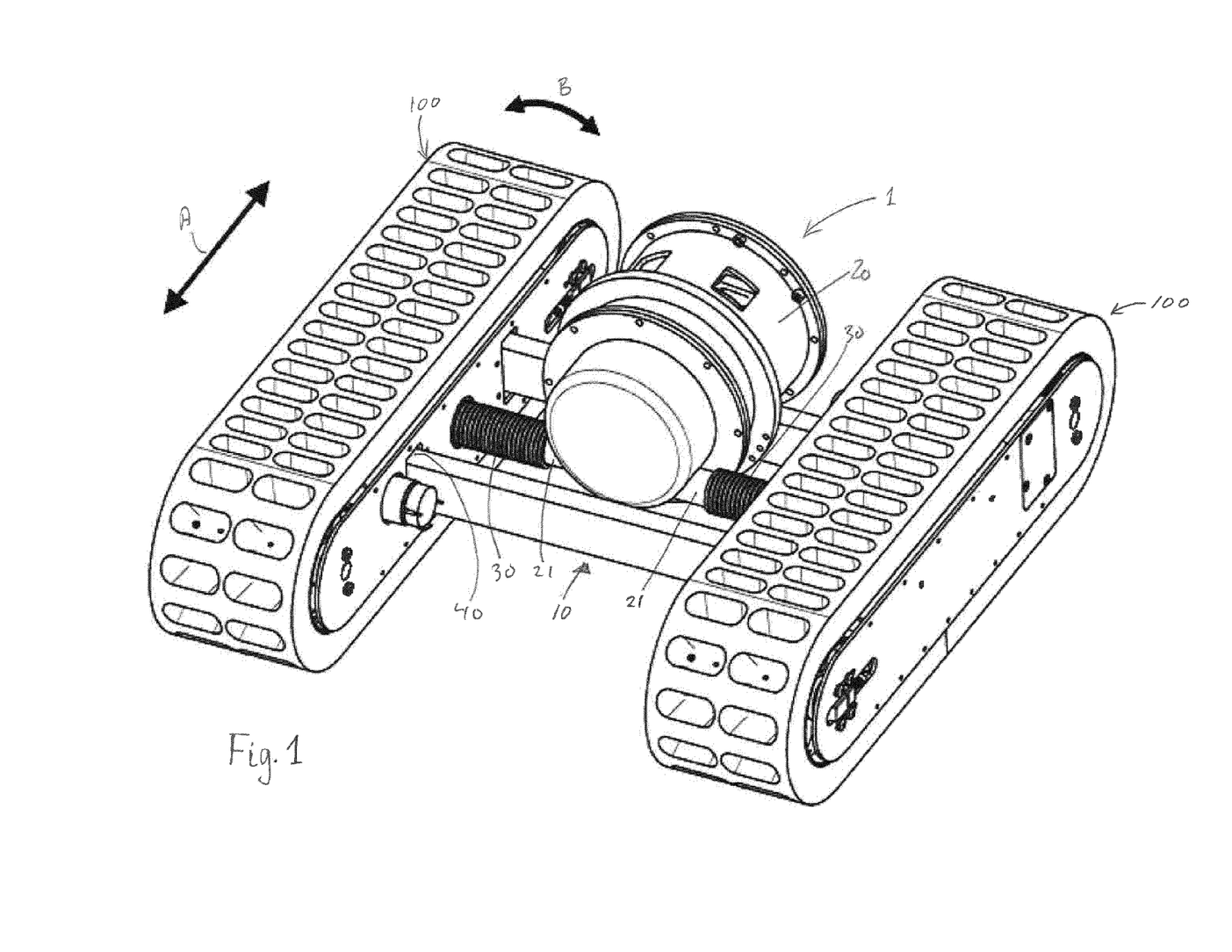
FIG. 1, in a perspective view, shows a vacuum wall crawler according to an embodiment of the present invention, the vacuum wall crawler comprising two vacuum traction units and a frame, FIG. 2, in an exploded perspective view, shows the vacuum wall crawler of FIG. 1, FIG. 3, in an exploded perspective view, shows a vacuum traction unit of the vacuum wall crawler of FIG. 1, FIG. 4, in an exploded perspective view, shows details of a the vacuum traction unit shown in FIG. 3 from a different perspective, FIG. 5, in an exploded perspective view, shows details of a the vacuum traction unit shown in FIGS. 3 and 4 from yet a different perspective, FIG. 6, in an exploded perspective view, shows details of a traction band according to the invention, FIG. 7, in a bottom view shows, a vacuum traction unit of the vacuum wall crawler shown in FIG. 1.

FIG. 1 shows a first exemplary embodiment of a vacuum wall crawler 1.

A vacuum wall crawler 1 is a moving device that is capable of attaching to a surface, such as wall or a ceiling etc. by use of one or more suction track units 100. The vacuum wall crawler 1 shown in FIG. 1 has two suction track units 100. The suction track units 100 are connected to a main frame 10 through joints 40 allowing the vacuum wall crawler 1 to adapt to curved surfaces, on which it drives, see below.

In other embodiments (not shown) a vacuum wall crawler 1 may have more than two suction track units 100 connected via a main frame 10.

The main frame 10 comprises bars 11, 12, 13, stretching transversely between the suction track units 100. The main frame may carry a suction unit 20 as shown in FIG. 1, and equipment such as cameras, robot arms, tools, etc. (not shown). In the embodiment shown in FIGS. 1 and 2, the main frame 10 comprises a first bar 11 extending all the way between the two suction track units 100, and two second bars 12, 13 extends from each of the suction track units 100 to the suction unit 20. The second bars may be connected to the suction unit 20 in known ways, e.g. by welding, or screw connections etc. Other main frame structures will be apparent to the person skilled in the art.

Figure 3:
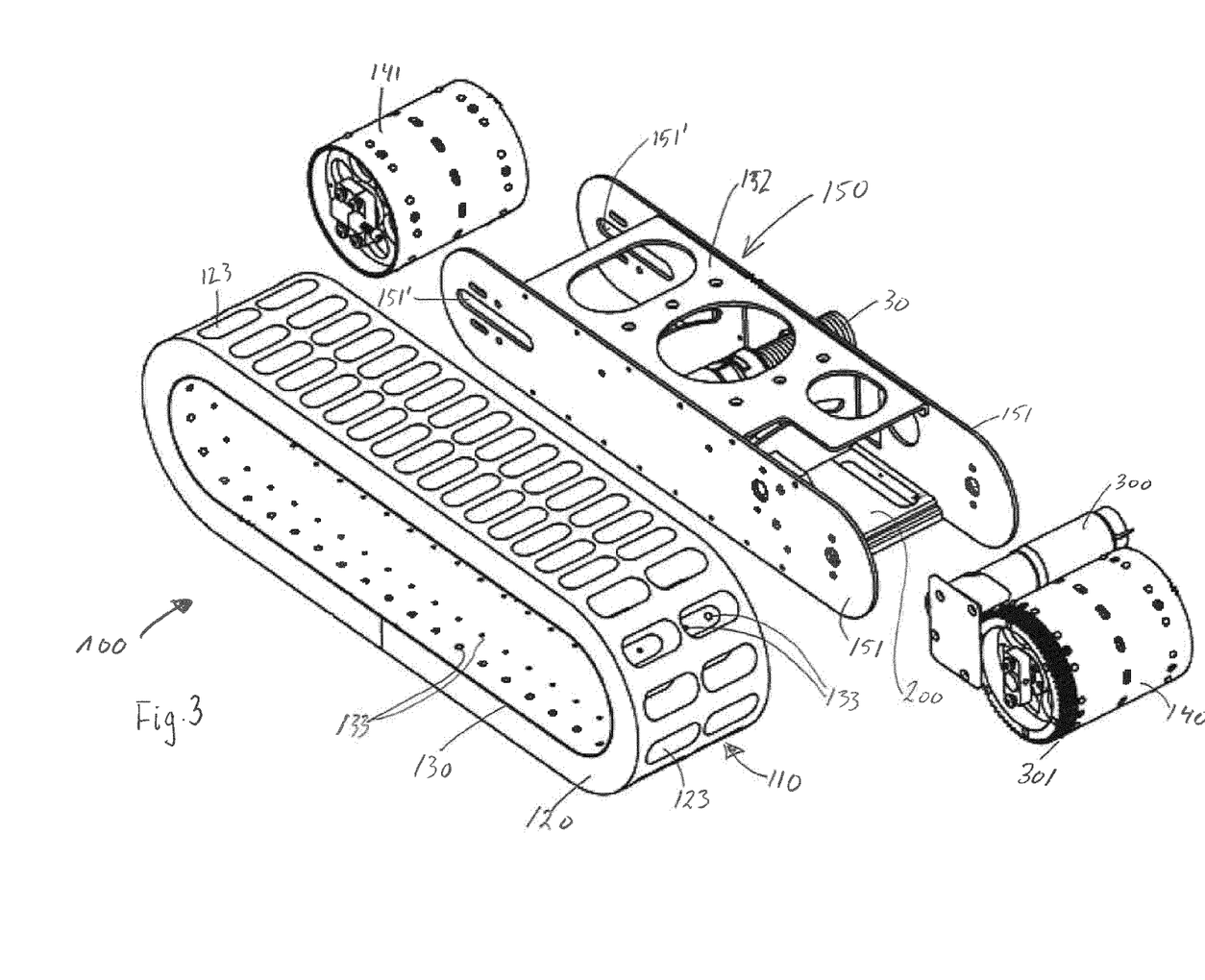
Figure 4:
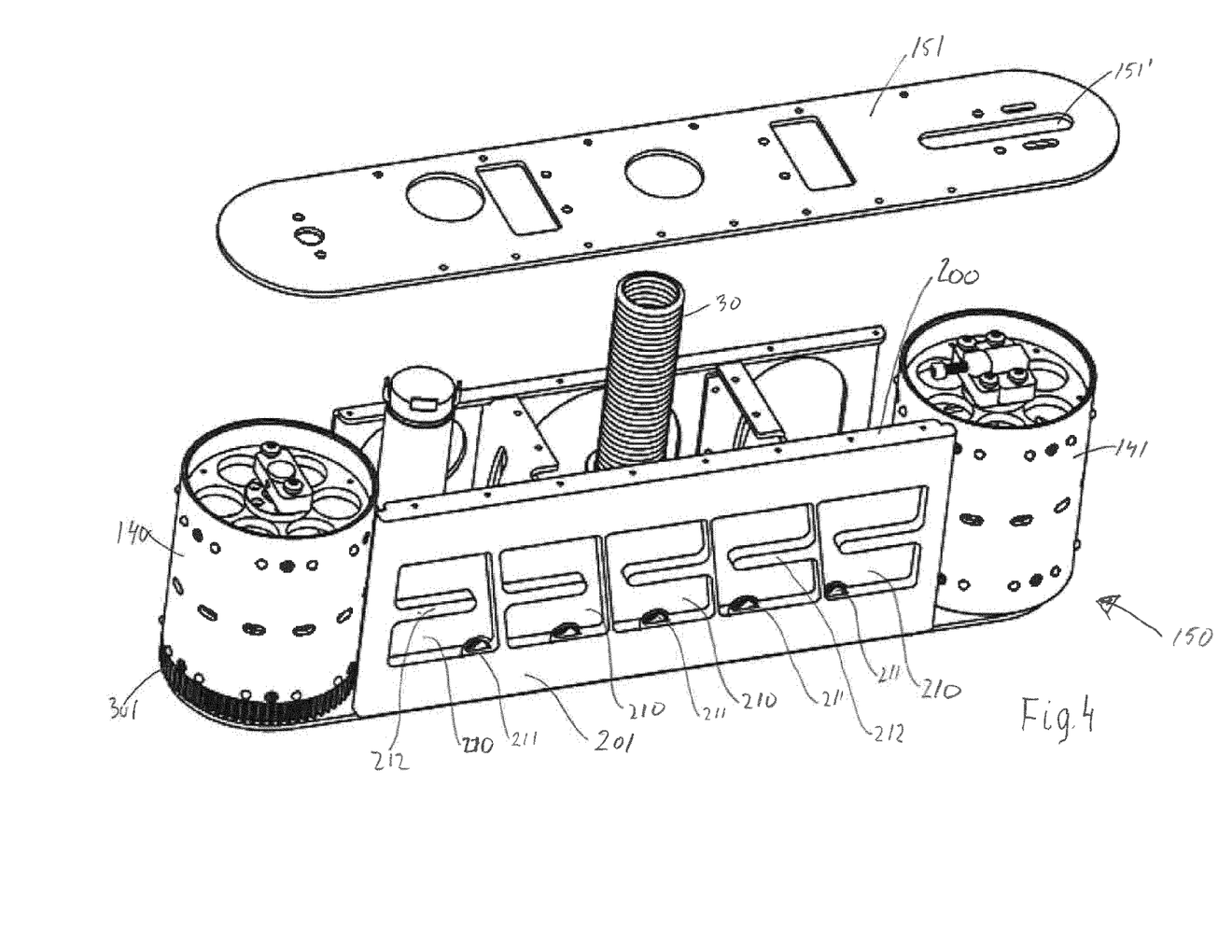
Figure 5:
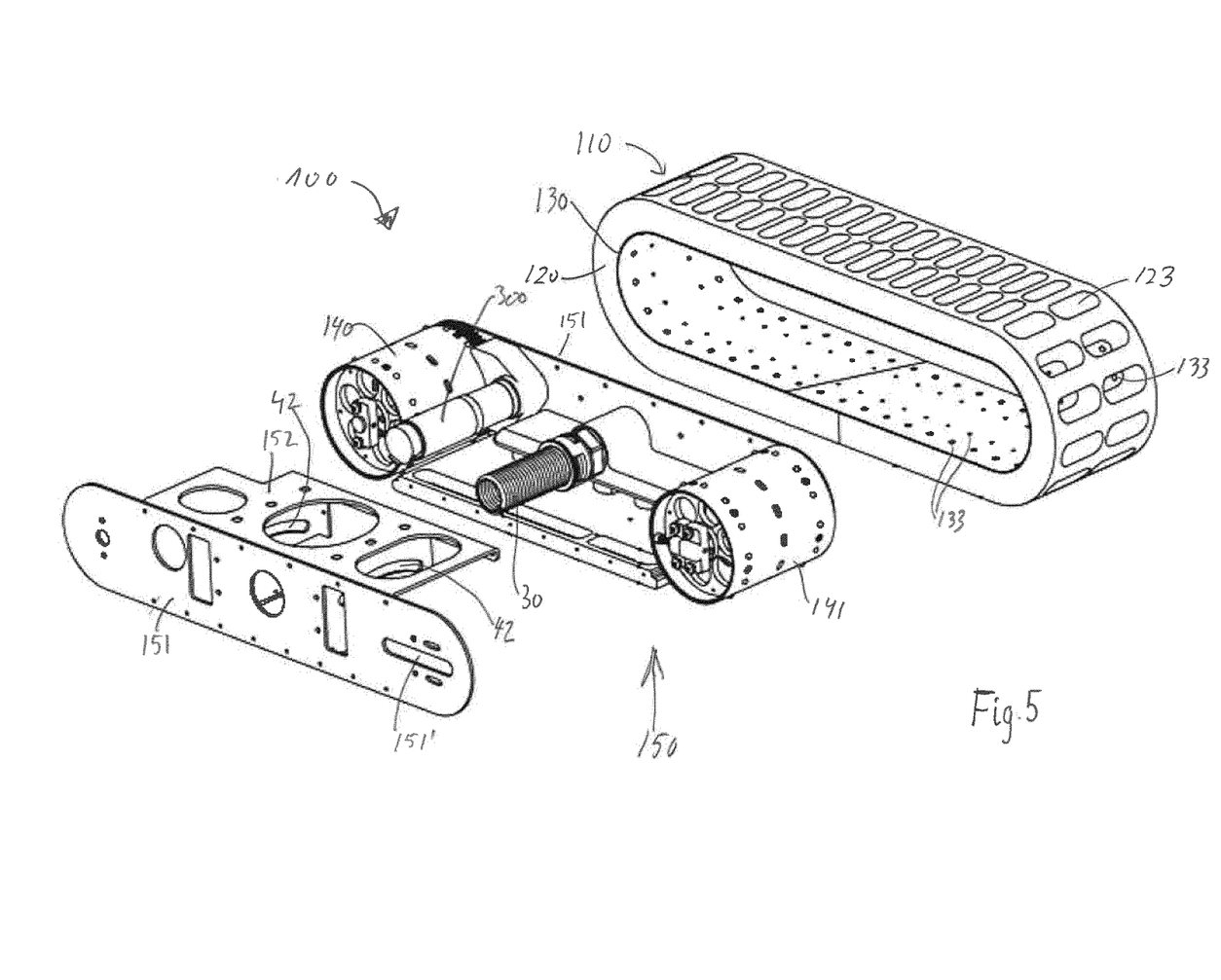

Referring now to FIG. 3, showing an exploded view of a suction track unit 100, each suction track unit 100 comprises an endless track 110 mounted on a drive pulley 140 and a support pulley 141. The endless track 110 of the suction track unit 100 is build around a track frame 150 that supports the drive pulley 140, the support pulley 141, a drive motor 300 and a transmission between the drive motor 300 and the drive pulley 140. The drive pulley 140 and the support pulley 141 are rotationally mounted in a track frame 150. The track frame 150 is an elongate structure comprising two side walls 151 and a top wall 152, as seen in FIGS. 4 and 5. The drive pulley 140 and the support pulley 141 are mounted in opposite ends of the track frame 150.

The track frame 150 further comprises a vacuum distribution box 200 formed with a plurality of vacuum compartments 210. The vacuum distribution box 200 forms a bottom wall of the track frame 150, arranged opposite to the top wall 152.

Suction unit(s) 20 may in alternative embodiment (not shown) be integrated into the track frame 150.

The track frame 150 may be formed in metal, plastic or fibre reinforced plastic. The track frame 150 further comprises parts 42 of the joints connecting the suction track units to the main frame 10, see below.

The vacuum distribution box 200 is an elongate relatively flat box structure, extending between the drive pulley 140 and the support pulley 141, and having an external side 201 facing the endless track 110 (when the suction track unit 100 is in an assembled state) and oppositely, an internal side 202 facing an internal space of the track frame 150.

As may be appreciated from FIG. 4, showing an exploded view of a suction track unit 100 from a different angle than in FIG. 3, the vacuum distribution box 200 comprises a plurality of vacuum compartments 210. Each vacuum compartment 210 is open towards the external side 201 of the vacuum distribution box 200. Each vacuum compartment 210 is connected to the suction unit 20 through a vacuum valve 32, an air manifold 31 and a hose 30, see FIG. 5. Hose 30 extend through a sidewall 151 of the track frame 150 and connects to a connector 21 of the suction unit 20. More details regarding the vacuum distribution box 200 are provided below.

The suction unit 20 is a source of vacuum, and provides vacuum allowing the suction track units 100 to suck to a surface on which the vacuum wall crawler is located. A suction unit may be a vacuum cleaner motor, a vacuum injector pump, a vacuum pump, or similar. One or more suction units 20 may be provided in the vacuum wall crawler. In the embodiments shown throughout the figures, a single suction unit is provided. The suction units 20 can be mounted on the main frame 10 of the vacuum wall crawler 1, as shown, or one or more suction units may in alternative embodiments (not shown) be integrated into one or more suction track units 100. Additional suction units may be provided in a vacuum wall crawler 1 to provide redundancy, so that if one suction unit fails, another may take over, and prevent the vacuum wall crawler from loosing traction. In other alternative embodiments (not shown) a suction unit may be provided as an external unit connected to the vacuum wall crawler 1 via a long hose.

In the embodiments shown in the figures, that suction unit 20, is mounted to the main frame 10. The suction unit 20 has two connectors 21, see FIGS. 1 and 2, for connecting the suction unit 20 to the suction track units 100 via suitable hoses 30.

On each suction track unit 100, the endless track 110 is running on minimum two pulleys 140, 141, as shown in the figures. At least one of these is a drive pulley 140. Its rotation is powered by a motor 300, see FIG. 3, through a transmission in the form of a gear, belt or chain transmission. In the embodiment shown the transmission is a toothed gear transmission, a ratchet wheel 301 of which is visible on the drive pulley 141 in FIG. 3. The other pulley, the support pulley 140, is used for support of the endless track 110, and for tightening of the endless track 110, see below.

In the embodiments shown, there is only one drive pulley 140. However, in alternative embodiments (not shown), both pulleys 140, 141 may be coupled to drive means.

In the embodiments shown, the pulleys 140, 141 are of equal size. However, in alternative embodiments (not shown), the two pulleys 140, 141 may differ in size.

In the embodiments shown, the vacuum wall crawler 1 has two suction track units 100. Each of the endless tracks 110 is powered by an individual motor, making it possible to steer the vacuum wall crawler 1.

Figure 6:
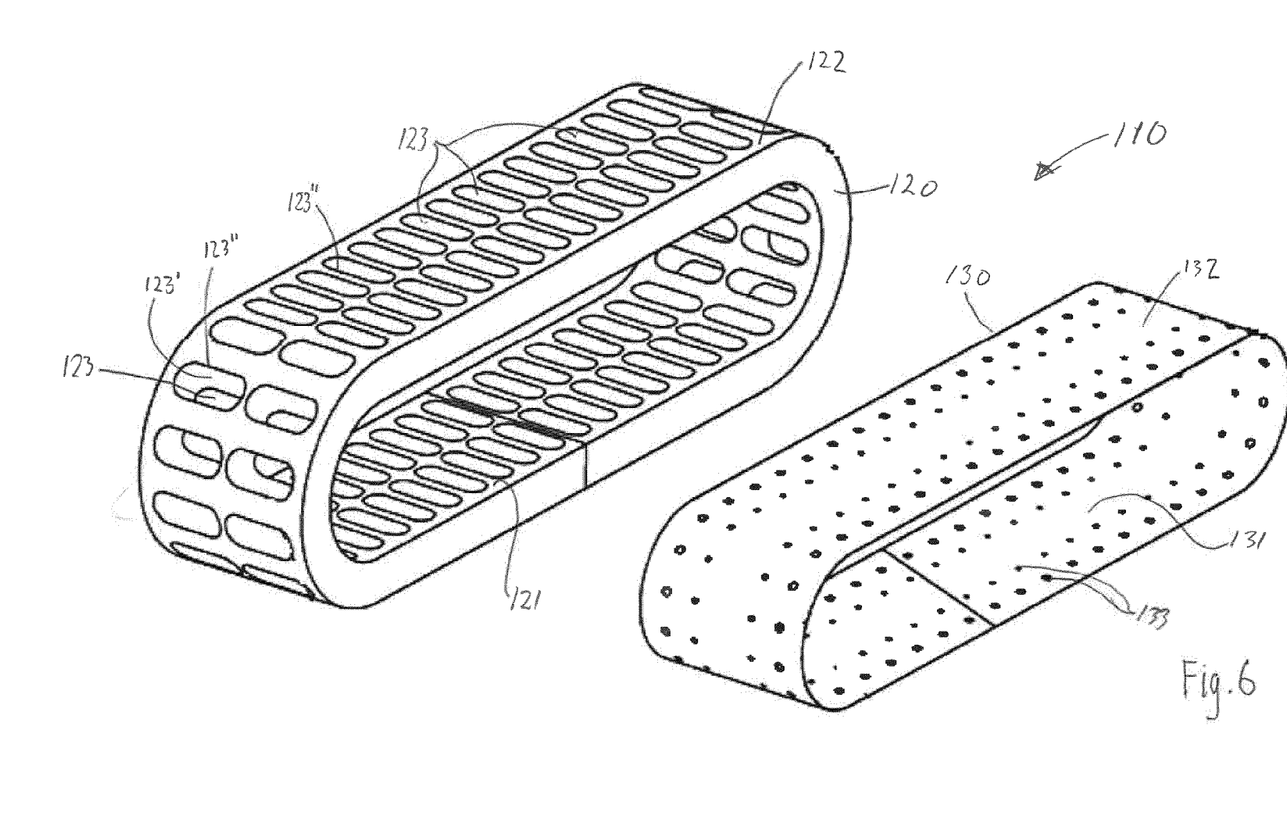
Figure 7:
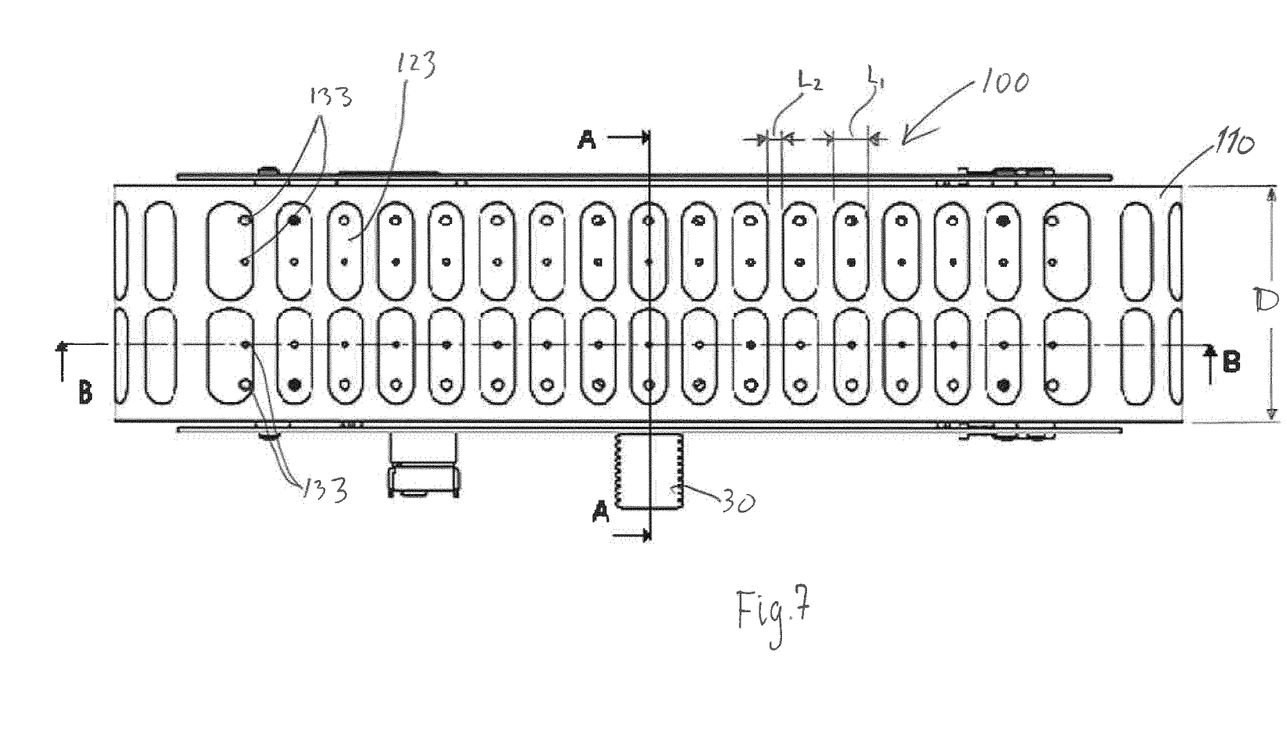

The endless track 110 comprises an endless outer band 120 and an endless inner band 130, see FIG. 6. FIG. 6 shows an endless track 110 in an exploded, perspective view. The outer band 120 has an inwardly facing side 121 and an outwardly facing side 122. The outer band 120 is thicker than the inner band 130, and is formed in a soft flexible material. The inner band 130 has an inwardly facing side 131 and an outwardly facing side 132. The outwardly facing side 132 of the inner band 130 and the inwardly facing side 121 of the outer band 120 are fixedly attached to each other to prevent relative movement of the inner band 130 and outer band 120 during movement of the endless track 110. The inner and outer bands 130, 120 are preferably fixedly connected to each other to prevent relative movement of the two, e.g. by gluing or by other suitable means which will be apparent to a person skilled in the art.

When assembled, the outwardly facing side 132 of the inner band 130 contact the inwardly facing side 121 of the outer band 120. The inwardly facing side 132 of the inner band contacts outer surfaces of the top wall 152, the drive pulley 140, the support pulley 141 and the external side 201 of the vacuum distribution box 200, when the inner band 130 is mounted on the track frame 150 of the suction track unit 100.

The outer band 120 has a plurality apertures 123 extending all the way through the outer band 120 from the inwardly facing side 121 to the outwardly facing side 122. The inner band 130 has through going suction holes 133, from the inwardly facing side 131 to the outwardly facing side 132.

The suction holes 133 in the inner band 130 connects the vacuum compartments 210 of the vacuum distribution box 200 to the apertures 123, such that when a vacuum applied to the compartments 210 of the vacuum distribution box 200, as described above, the vacuum extends to the apertures 123, and provides a suction to the surface the vacuum wall crawler 1 is located on.

When driving the vacuum wall crawler 1 on a surface, the thick, soft outer band 120 secures a rolling vacuum sealing between the surface and the endless track 110, also in cases where the surface is curved or rough.

The inner band 130 has a smooth low friction inner surface of the inwardly facing side 131. The inner band 130 is made of flexible and strong material such as metal or fibre reinforced plastic. The size of the inner band 130 (length, width, number and size of suction holes 133) is designed depending on the requirement for the actual suction track unit 100 and vacuum wall crawler 1. Preferably the inner band is 0.2-0.7 mm thick.

The inner band 130 provides an inner vacuum sealing between the outer band 120 and the vacuum distribution box 200 of the box track frame 150. The inner band also provides a low friction contact between the surface of the external side 201 of the vacuum distribution box 200 and the outer band 120.

The outer band 120 is made of a soft material, and as mentioned above equipped with a number of through going aperture 123. The outer band 140 further is made of an air tight material or it may be coated in a suitable manner to be air tightened. The apertures 123 in the outer band 140 are closed towards the inwardly facing side 121 at all times by the inner band 130, and when the outer band's rim 123" provides a rolling sealing between the apertures 123 and the surroundings. The apertures 123 provides temporary suction chamber or temporary vacuum chamber that provides the attachment force between the suction track unit 100 and the surface on which it is located, when they are connected to the vacuum in the vacuum distribution box 200 through the suction holes 133 in the inner band 130. When the vacuum wall crawler 1 moves on a surface the endless track 110 circulates on the pulleys 140, 141 and the track frame 150. The apertures 123 that are—at any specific time—located on the side of the suction track unit 100 that faces the surface on which the vacuum wall crawler 1 moves, will then form said temporary suction chambers, the temporary suction chambers or vacuum chambers then being defined between the inner walls 123' of the aperture, a portion of the outer surface 132 of the inner band 130, and the surface on which the vacuum wall crawler moves. When a specific aperture moves to be located adjacent to a pulley 140, 141 as the endless track 110 circulates, the temporary suction chamber ceases to exist.

The percentage of the area of the outer band 120 that is equipped with apertures 123 is a compromise between maximizing the suction area and the strength of the outer band 120. Therefore the optimal percentage aperture out area is optimized depending on the thickness and softness of the band in combination with the operation conditions (orientation, curvature and roughness of operation surface). The percentage of apertures 123 should be in the range 30-70% of total band area (defined as the total area of surface of the outwardly facing side 122 of the outer band 120).

A thicker and softer band will be particularly useful for operating a vacuum wall crawler 1 on curved surfaces or surfaces with obstructions (protrusions) that must be passed.

Preferably, the thickness, T, of the outer band 120 is in the range 5-20% of the wheel base, W, of the endless track 110. Even more preferably, the thickness, T, of the outer band 120 is in the range 6-20% of the wheel base, W, of the endless track 110. Even more preferably, the thickness, T, of the outer band 120 is in the range 7-15% of the wheel base, W, of the endless track 110.

The wheelbase, W, of the endless track 110 is defined as the distance between the rotational axes $C_1$, $C_2$ around which a foremost and rearmost pulley 140, 141, of a suction track unit 100 rotate. In the embodiments shown, this is the distance between the drive pulley 140 and the support pulley 141.

The outer band may be formed in a flexible cellular materials sponge or in expanded rubber.

The softness of the outer band 120 may be selected depending on the surface roughness and curvature of the surfaces on which the wall crawler is intended to move.

There are various ways of defining the hardness or stiffness or softness of elastomeric materials.

One way to define the softness is defined by the ASTM D1056-00. This is the Standard Specification for Flexible Cellular Materials Sponge or Expanded Rubber. According to this standard the softness (hardness) may be measured in PSI or in kPa. Other definitions exist.

A preferred softness is 5-100 kPa, according to ASTM D 1056-00 (25%) or 30-250 kPa according to NF R 99211-80 (50%).

More preferably, the softness of the outer band 120 is 5-60 kPa (ASTM D 1056-00 (25%)).

More preferably, the softness of the outer band 120 is 10-55 kPa (ASTM D 1056-00 (25%)).

More preferably, the softness of the outer band 120 is 10-50 kPa (ASTM D 1056-00 (25%)).

In one embodiment the softness of the outer band 120 is 45 kPa (ASTM D 1056-00 (25%)).

Another way to quantify the softness or hardness of a polymer material is defined by the ASTM D 2240 Standard Test Method for Rubber Property—Durometer Hardness. In the test the hardness/softness of a material I measured with a durometer, e.g. a durometer from Affri system, Hardness tester, Shore 0". According to this standard, a preferred hardness/softness of of the outer band 120 is 10-30 (shore 0 hardness), according to ASTM D 2240.

More preferably, the softness of the outer band 120 is 10-20 (shore 0 hardness) (ASTM D 2240).

In one embodiment the softness of the outer band 120 is 15 (shore 0 hardness) (ASTM D 2240).

The use of a vacuum distribution box 200 in combination with the smooth inner band 130 with suction holes 133 provides a simple type of valve system that only secures that vacuum only is provided to the lower part of the endless track 110 facing the surface on which the vacuum wall crawler 1 is located.

Preferably, two suction holes 133 per aperture 123 in the outer band 120 are arranged in the inner band 130. The size of the suction holes 133 in the inner band 130 may be varied according to the use of the vacuum wall crawler 1. If the vacuum wall crawler 1 is intended for working on surfaces where is has to pass obstructions that can lead to loss of vacuum in some apertures 123 of the outer band 120, an inner band 130 having smaller suction holes 133 may be utilized. Alternatively or additionally the number of suction holes 133 may be reduced. Smaller holes 133 prevent loss of vacuum in the entire vacuum distribution box 200 by delaying the spreading of loss of vacuum in a single aperture 123 in the outer band 120. If the vacuum wall crawler 1 is intended for working on rough surfaces, where general leakage is expected, an inner band 130 having larger suction holes 133 may be utilised to secure sufficient air flow to compensate for leakage. Alternatively or additionally the number of suction holes 133 may be increased.

The diameter of the suction holes 133 is preferably in the order of 1-2 mm.

In embodiment of the invention, where an inner band 130 is not used (not shown), the apertures 123 of the outer band 120 may be provided with a bottom (not shown) of reduced thickness, the bottom being provided with suction holes (not shown) similar to the ones describe in connection with the inner band 130 above.

In alternative embodiments, the inner band 130 may form a part of the transmission for the movement of the vacuum track unit 100 (not shown). This may be arranged by providing the inner band 130 with lugs or perforations (not shown) for engaging sprocket or teeth (not shown) on a drive pulley 140. External drive units such as timing belts or chains can be attached to the inner band 130 for providing transmission of power from motor 300 to the endless track 110.

The outer band 120 of the track provides the necessary friction for driving of the suction track units 100 of the vacuum wall crawler 1. For enhanced strength the outer band 120 may be coated with a flexible coating.

Preferably, the apertures 123 in the outer band are distributed in two parallel rows along the endless track 110, such that two apertures 123 are located next to each other in the width, D, of the endless track 110. Thereby, an increased flexibility of the outer band 120, aiding the softness of the outer band 120 to adapt to obstacles, is provided. Further, arranging the apertures 123 in two rows, aids in maintaining a vacuum suction for a section of the outer band 120 if a neighbouring aperture 123 looses suction due to e.g. an obstacle.

In other embodiments (not shown), the apertures 123 in the outer band are distributed in three parallel rows along the endless track 110, such that three apertures 123 are located next to each other in the width, D, of the endless track 110. In this case, the suction box may also be divided in three parallelly arranged chambers.

Preferably, the apertures 123 are so wide (in the transverse direction of the outer band), that the apertures 123 take up 70-90% of the width, D of the band 120.

In order to further improve the ability to traverse obstacle and curved surfaces, preferably the length, $L_1$ of an aperture 123 is greater than a distance, $L_2$ between to neighbouring apertures along the longitudinal direction, A, of the vacuum track unit 100. It has been found that preferably, $L_1$ should be the double of $L_2$.

Figure 8:
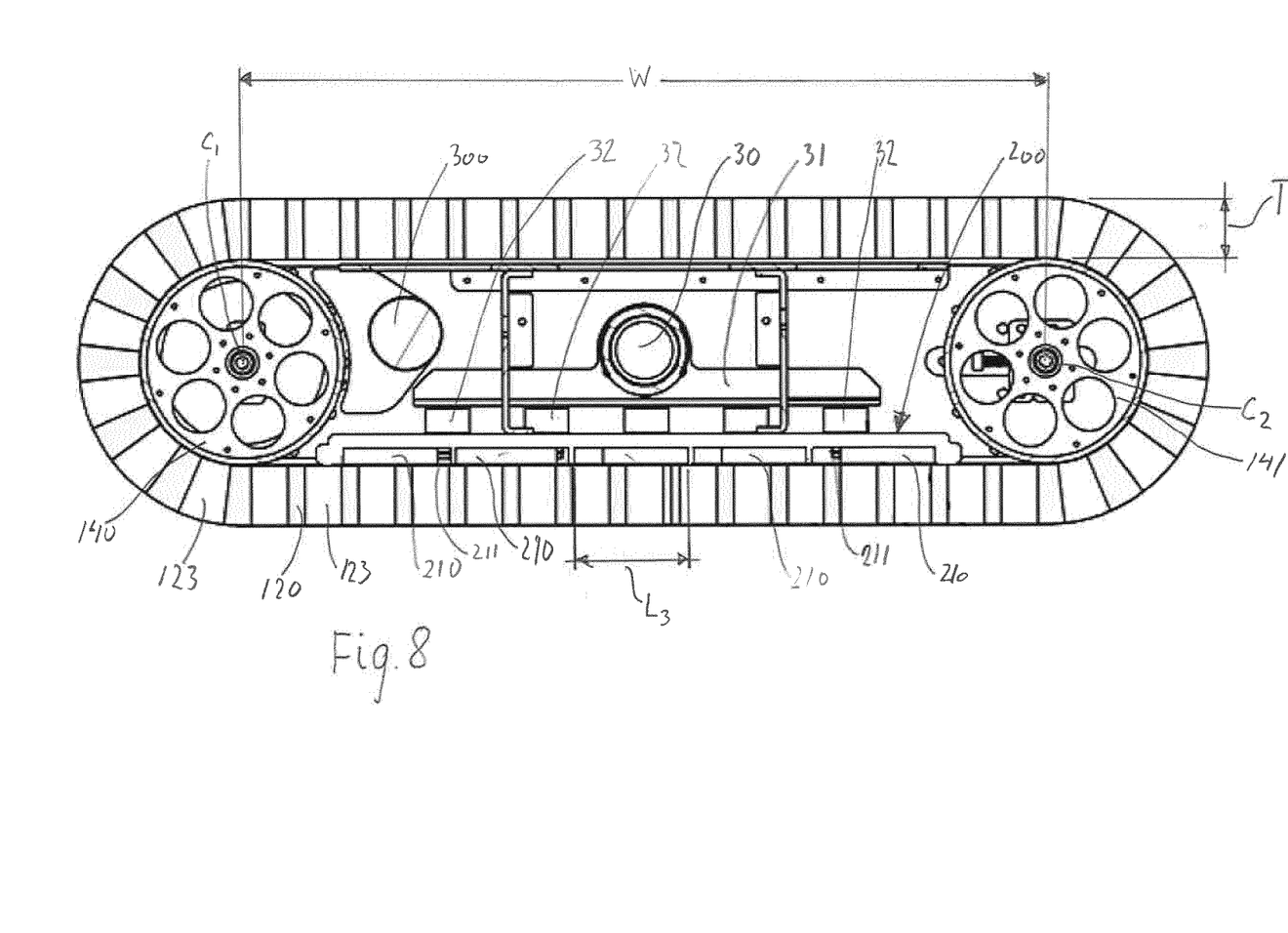
FIG. 8 shows a longitudinal cross section B-B, through the traction unit in FIG. 7.

As shown in FIGS. 4 and 8, the vacuum distribution box 200 is preferably sectioned into vacuum compartments 210, along the longitudinal direction A.

Figure 9:
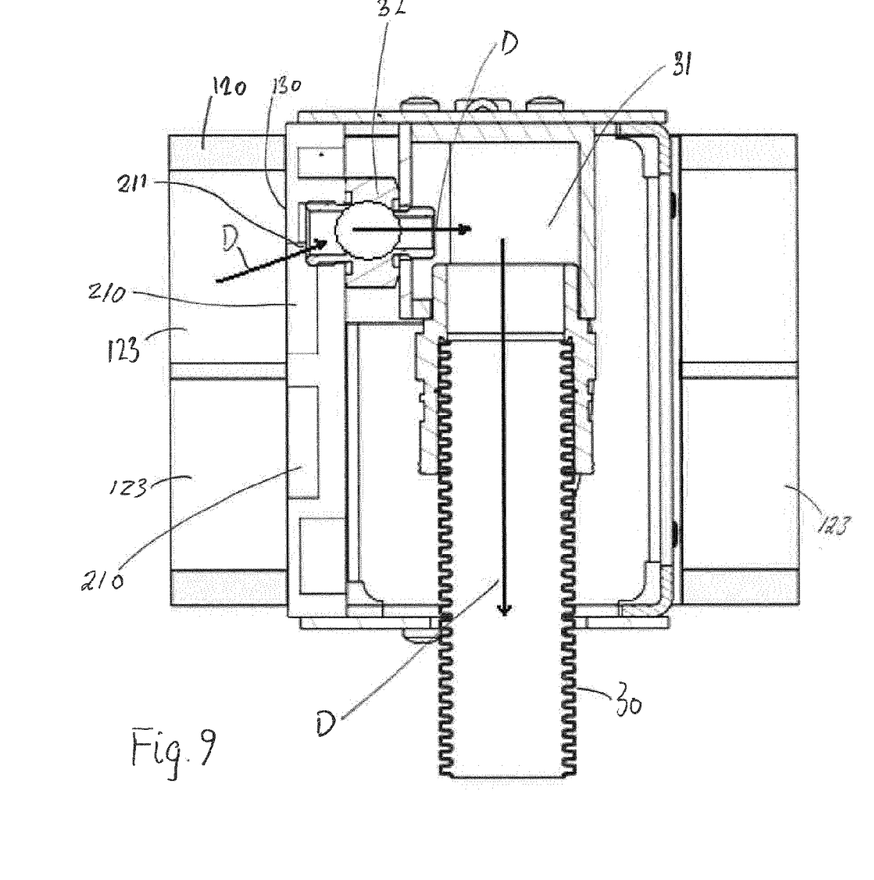
FIG. 9 shows a transverse cross section A-A, through the traction unit in FIG. 7.

Each of the vacuum compartments 210 has as an outlet 211 (see FIG. 4) which is communicating with a one way valve 32 (see FIGS. 5, 8 and 9). A length, $L_3$, in the longitudinal direction A, of the vacuum compartments 210 is preferably adapted such that each vacuum compartment 210 may supply vacuum to two apertures 123 as seen in the in the longitudinal direction A of the vacuum track unit 100. In other embodiments (not shown), length, $L_3$, may be chosen such that a vacuum compartment 210 supplies only a single aperture 123 as seen in the in the longitudinal direction A of the vacuum track unit 100.

Preferably, and as shown in FIG. 4, each vacuum compartment 210 is provided with a support flange 212, partly dividing the vacuum compartments 210 into two half compartments 210' and 210", the support flange 212 extending in the longitudinal direction A of the vacuum track unit 100, and not traversing the entire length, $L_3$, of the vacuum compartment 210, such that communication between the two half compartments 210' and 210" is possible. The support flange 212 supports the inner surface of the inner band 130, and thereby supports the endless track to prevent the endless track to cave into the vacuum compartments 210. The division of the vacuum compartments 210 into two half compartments 210' and 210" also aids the maintenance of suction in neighbouring apertures 123 if an aperture 123 looses vacuum due to e.g. an obstacle, due to a slower transfer of vacuum between the half parts.

In further embodiments (not shown), the flange 212 extending in the longitudinal direction A of the vacuum track unit 100 divides each vacuum compartment into half compartments 210' and 210" without fluid communication between the two. Thereby, the vacuum compartments 210 are arranged in two parallel rows along the longitudinal direction A of the vacuum track unit 100. This will require a one way valve for each half compartment 210', 210". This will further increase the ability of apertures 123 in the outer band 120 to compensate for vacuum loss in a neighbouring aperture 123.

A tension mechanism (not shown) may be applied to keep the endless track 110 sufficiently stretched/tensioned at all times during operation, by controlling and adjusting the distance between the pulleys 140, 141 to a desired tension. The endless track 110 is preferably maintained in a tensioned state at all times by a tension mechanism acting and arranged between the support pulley 141 and the track frame 150. In FIG. 3 elongate guide apertures 151' formed in side walls 151, are shown form. The elongate guide apertures 151' receives the axle on which the support pulley 141 is arranged to rotate. The tension mechanism (not shown) is provided between the support pulley 141 and the track frame 150, biasing the support pulley 141 in a direction away from the drive pulley 140 in the other end of the track frame 150. The tension mechanism may comprise springs or hydraulic or pneumatic means.

Figure 2:
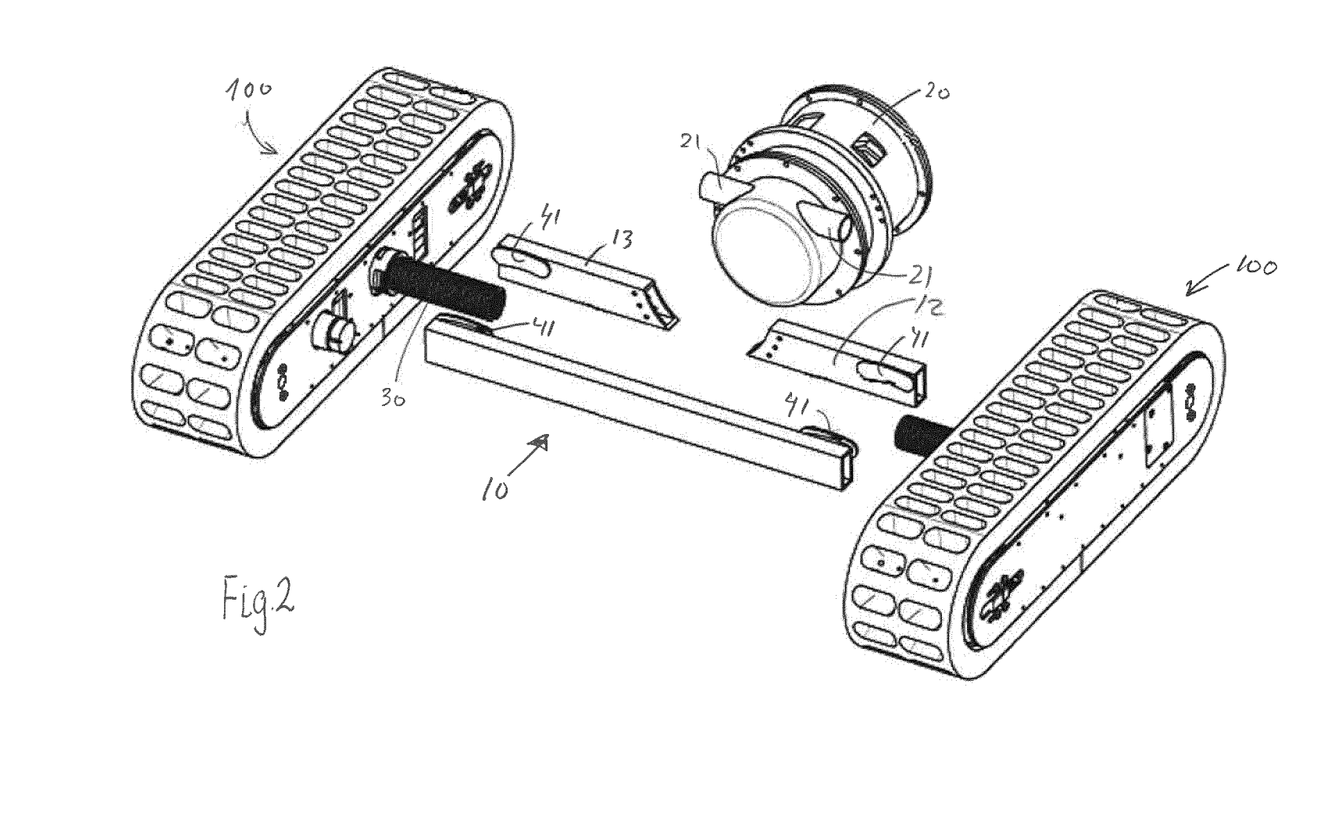

The joints 40 between the main frame 10 and the suction track units 100 allows a suction track unit 100 to be tilted relative to the main frame 10 (and thereby the other suction track units 100) about a longitudinal axis, A, of the suction track units 100 as indicated by the curved arrows B in FIG. 1. The joint 40 may as indicated in FIG. 2 comprise elongate curved protrusions 41 (scimitar shaped/circle section shaped) on the bars 11, 12, 13 of the frame 10 extending into the suction track units 100. Cooperating curved receptacle tracks 42 are arranged on flanges in the track frame 150 of the suction track units 100. The curved protrusions 41 allow a soft rotational relative movement between the main frame 10 and the suction track units 100, because the movement mixes a rotational movement with slight translational movement. In other embodiment (not shown), the curved protrusions and the curved receptacle tracks may be switched between the main frame 10 and the suction track units 100. Preferably, the rotation or tilt between suction track unit 100 and the main frame 10 is moderated by suspension means (not shown), such as springs or hydraulic suspension means. The joints secure rotation line near surface for best stability. For optimal stability on planar surfaces the joints 40 can be locked by locking means (not shown).

The vacuum distribution box 200 distributes the vacuum from the suction unit 20 to the part of the endless track 110 that is in contact with the surface on which the vacuum wall crawler 1 is located or moves. The vacuum distribution box 200 also provides support to the endless track 110. Its outer surface 201 acts as a low friction vacuum sealing between the box and the inner band 130 of the endless track 110. The vacuum distribution box 200 can have one or more vacuum compartments 210, and internal support structures; see FIG. 4. With a plurality of vacuum compartments 210 it is possible to increase the security against failure due to leakage of vacuum. Each vacuum compartment 210 can be connected to individual suction units 20, or to a single suction unit 20 common to the vacuum compartments 210, through individual one way vacuum valves 32 and a vacuum manifold 31. The one way vacuum valves 32 secures that, loss of vacuum in one vacuum compartment will not affect the vacuum in the other compartments. The vacuum distribution box 200 is made of a material that in combination with the inner band 130 has a low friction. In a preferred embodiment, the vacuum distribution box 200 is an integrated part of the track frame 150. Alternatively, it may be a separately assembled part which is mounted in the track frame 150.

FIG. 9 illustrates details of the evacuation of air from an aperture 123 of the outer band 120. The flow of air is indicted by arrow D.

A controller may be incorporated in the frame 10, or be attached thereto, or be provided in one or both suction track units 100.

The controller may be further be connected to communication means (not shown), such as wireless communication means, allowing remote control of the vacuum wall crawler 1.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A vacuum wall crawler having at least one vacuum track unit comprising:
   a track frame;
   two pulleys provided in opposite ends of the track frame, and defining a wheelbase;
   an endless track arranged to circulate on the two pulleys, and comprising a flexible band,
   said flexible band comprising a plurality of apertures, and having a thickness;
   a vacuum distribution box provided in said track frame
   wherein the vacuum distribution box is in communication with a portion of the plurality of apertures to distribute a vacuum to the portion of the plurality of apertures as the endless track circulates,
   the flexible band is an outer band, the endless track further comprising an inner band, said inner band having suction holes allowing vacuum to pass between the vacuum distribution box and the portion of the plurality of apertures, and
   the outer band and the inner band are made of different materials.

2. The vacuum wall crawler of claim 1, wherein the thickness of the flexible band is 5-20% of the wheelbase.

3. The vacuum wall crawler of claim 1, wherein the flexible band has a softness of 10-30 shore.

4. The vacuum wall crawler of claim 1, wherein said vacuum distribution box is sectioned into vacuum compartments along a longitudinal direction of said vacuum track unit.

5. A vacuum wall crawler having at least one vacuum track unit comprising:
   a track frame;
   two pulleys provided in opposite ends of the track frame, and defining a wheelbase;
   an endless track arranged to circulate on the two pulleys, and comprising a flexible band,
   said flexible band comprising a plurality of apertures, and having a thickness;
   a vacuum distribution box provided in said track frame
   wherein the vacuum distribution box is in communication with a portion of the plurality of apertures to distribute a vacuum to the portion of the plurality of apertures as the endless track circulates,
   the flexible band is an outer band, the endless track further comprising an inner band, said inner band having suction holes allowing vacuum to pass between the vacuum distribution box and the portion of the plurality of apertures, and
   the outer band is softer than the inner band.

6. A vacuum wall crawler having at least one vacuum track unit comprising:
   a track frame;

two pulleys provided in opposite ends of the track frame, and defining a wheelbase;
an endless track arranged to circulate on the two pulleys, and comprising a flexible band,
said flexible band comprising a plurality of apertures, and having a thickness;
a vacuum distribution box provided in said track frame
wherein the vacuum distribution box is in communication with a portion of the plurality of apertures to distribute a vacuum to the portion of the plurality of apertures as the endless track circulates,
the flexible band is an outer band, the endless track further comprising an inner band, said inner band having suction holes allowing vacuum to pass between the vacuum distribution box and the portion of the plurality of apertures, and
the outer band and the inner band are separate components that are attached together.

* * * * *